(12) United States Patent
Akiyama (10) Patent No.: US 10,547,406 B2
(45) Date of Patent: Jan. 28, 2020

(54) OPTICAL ELEMENT

(71) Applicants: FUJITSU LIMITED, Kawasaki-shi, Kanagawa (JP); Photonics Electronics Technology Research Association, Bunkyo-ku, Tokyo (JP)

(72) Inventor: Tomoyuki Akiyama, Yokohama (JP)

(73) Assignees: FUJITSU LIMITED, Kawasaki (JP); PHOTONICS ELECTRONICS TECHNOLOGY RESEARCH ASSOCIATION, Tokyo (JP)

(*) Notice: Subject to any disclaimer, the term of this patent is extended or adjusted under 35 U.S.C. 154(b) by 40 days.

(21) Appl. No.: 15/642,859

(22) Filed: Jul. 6, 2017

(65) Prior Publication Data

US 2018/0013512 A1    Jan. 11, 2018

(30) Foreign Application Priority Data

Jul. 11, 2016 (JP) ................. 2016-136990

(51) Int. Cl.
| | |
|---|---|
| *G02F 1/035* | (2006.01) |
| *G02B 6/12* | (2006.01) |
| *H04J 14/02* | (2006.01) |
| *G02F 1/01* | (2006.01) |
| *G02F 1/225* | (2006.01) |
| *G02B 6/293* | (2006.01) |

(52) U.S. Cl.
CPC ...... *H04J 14/0221* (2013.01); *G02B 6/12007* (2013.01); *G02F 1/0121* (2013.01); *G02F 1/225* (2013.01); *G02B 6/2938* (2013.01); *G02B 6/29338* (2013.01)

(58) Field of Classification Search
CPC .............. G02B 6/1228; G02B 6/29338; G02B 6/29331; G02F 1/025; G02F 1/225; G02F 1/0121; H04J 14/0212
USPC .................................... 385/2, 14, 28, 43, 49
See application file for complete search history.

(56) References Cited

U.S. PATENT DOCUMENTS

| | | | | |
|---|---|---|---|---|
| 3,589,794 A | * | 6/1971 | Marcatili | ............... G01R 23/04 |
| | | | | 250/250 |
| 6,125,220 A | | 9/2000 | Copner | |
| 6,222,958 B1 | | 4/2001 | Paiam | |
| 6,252,716 B1 | | 6/2001 | Paiam | |

(Continued)

FOREIGN PATENT DOCUMENTS

| | | |
|---|---|---|
| JP | 2000-231063 A | 8/2000 |
| JP | 2009-059729 A1 | 3/2009 |

(Continued)

*Primary Examiner* — Kaveh C Kianni
*Assistant Examiner* — Hung Q Lam
(74) *Attorney, Agent, or Firm* — Kratz, Quintos & Hanson, LLP (57) ABSTRACT

An optical element includes a gain chip, a ring modulator, which is a band-pass filter, a first optical waveguide and a second optical waveguide that are optically connected to the ring modulator, and a heater, wherein the first optical waveguide and the second optical waveguide are formed to be equal in optical path length (have no difference in optical path length) between a first light coupling point and a second light coupling point and equal in shape and length between the first light coupling point and the second light coupling point (to be symmetrical with the ring modulator interposed therebetween (with respect to the ring modulator)).

11 Claims, 11 Drawing Sheets

(56) References Cited

U.S. PATENT DOCUMENTS

| | | | |
|---|---|---|---|
| 6,281,977 B1 | 8/2001 | Paiam | |
| 9,348,154 B2 * | 5/2016 | Hayakawa | G02F 1/025 |
| 9,575,256 B2 * | 2/2017 | Li | |
| 2001/0040681 A1 | 11/2001 | Paiam | |
| 2004/0258360 A1 * | 12/2004 | Lim | B82Y 20/00 |
| | | | 385/43 |
| 2009/0092159 A1 | 4/2009 | Kato | |
| 2014/0133511 A1 * | 5/2014 | Tanaka | H01S 5/0687 |
| | | | 372/50.11 |
| 2015/0016767 A1 | 1/2015 | Akiyama | |
| 2015/0355482 A1 * | 12/2015 | Akiyama | G02F 1/025 |
| | | | 385/2 |

FOREIGN PATENT DOCUMENTS

| | | |
|---|---|---|
| JP | 2012-064862 A1 | 3/2012 |
| JP | 2015-230991 A1 | 12/2015 |
| WO | 2013145195 A1 | 10/2013 |

* cited by examiner

OPTICAL ELEMENT

CROSS-REFERENCE TO RELATED APPLICATION

This application is based upon and claims the benefit of priority of the prior Japanese Patent Application No. 2016-136990, filed on Jul. 11, 2016, the entire contents of which are incorporated herein by reference.

FIELD

The embodiments discussed herein relate to an optical element.

BACKGROUND

It has been desired to develop an optical element that is compact and consumes a low power. In such an optical element, using a minute ring modulator with a silicon sub-micron optical waveguide has been studied.

Figure 9:
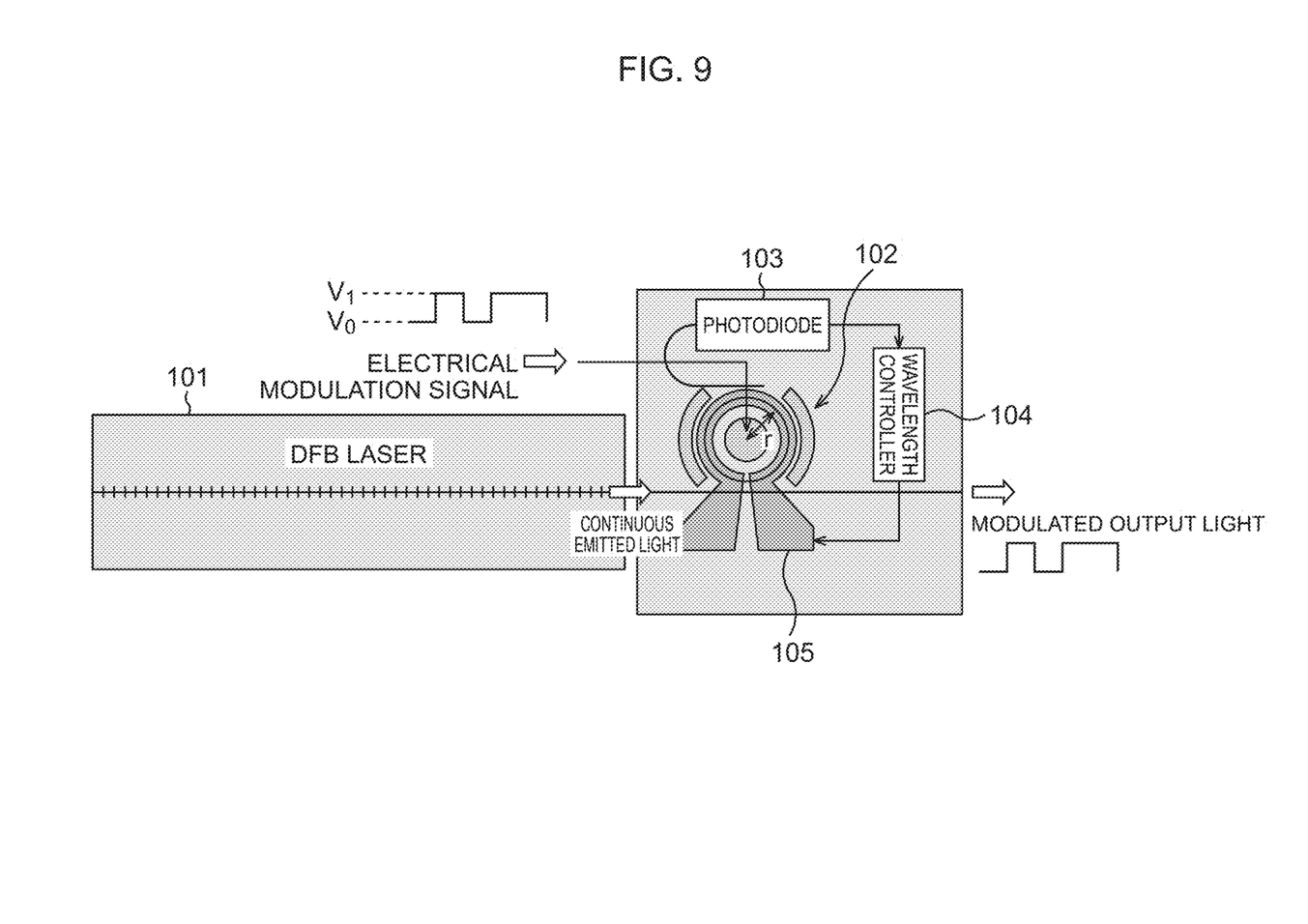
FIG. 9 is a diagrammatic view depicting a schematic configuration of an optical element of related art using a ring modulator.

FIG. 9 is a diagrammatic view depicting a schematic configuration of an optical element of related art using a ring modulator.

The optical element includes a distributed feedback (DFB) laser 101, a ring modulator 102, a PD 103, a wavelength controller 104, and a heater 105.

The PD 103 senses power of light having passed through the ring modulator 102. The wavelength controller 104 outputs a signal that controls the wavelength of laser light based on the optical power sensed with the PD 103. The heater 105 heats the ring modulator 102 in accordance with the control signal from the wavelength controller 104 to adjust the wavelength of the ring modulator to match the laser wavelength.

In the optical element, the DFB laser 101 outputs laser light in a continuous emission mode, and this laser light is guided to the ring modulator 102, which modulates the transmissivity at the laser light wavelength transmissivity.

The ring modulator 102 has a Lorentzian transmission spectrum centered at a resonance wavelength, and changes the resonance wavelength in accordance with a change in a modulation signal between voltages $V_0$ and $V_1$. The transmissivity is thus modulated, whereby intensity-modulated output light is produced.

Figure 10:
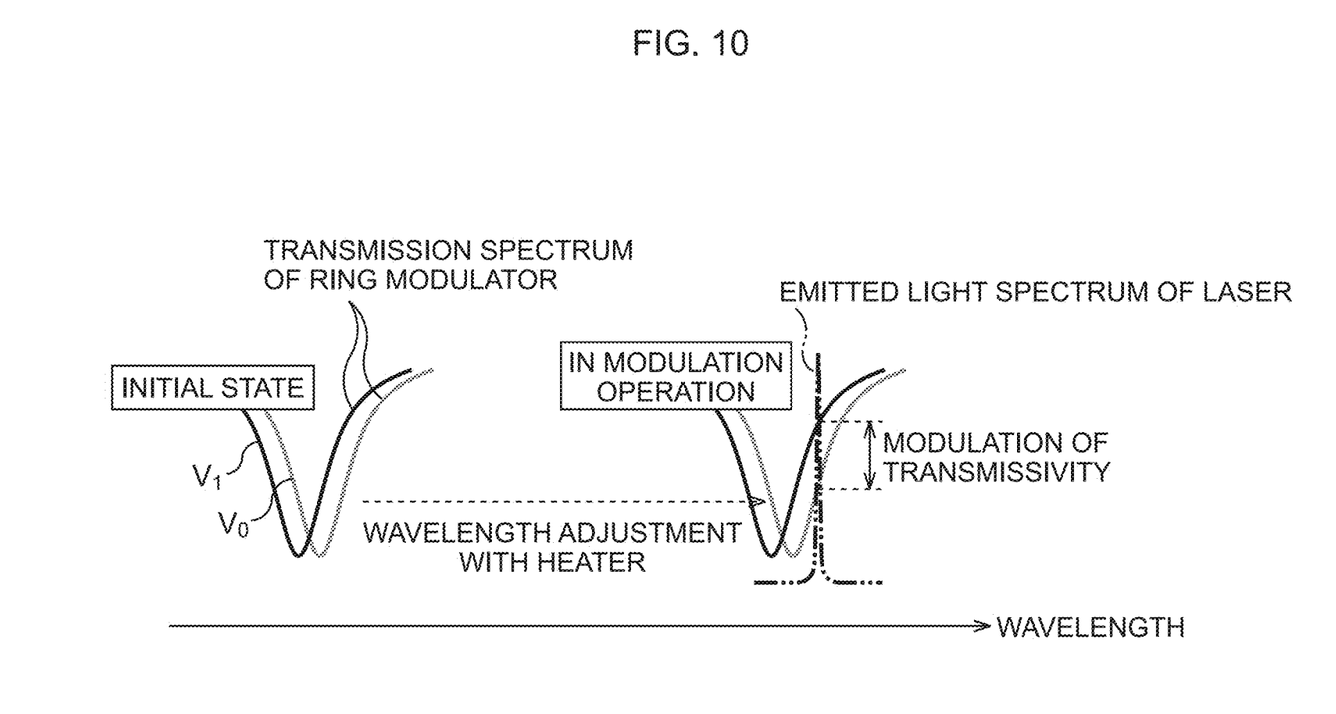
FIG. 10 is a diagram depicting how the optical element of related art adjusts the resonance wavelength.

The resonance wavelength of the ring modulator 102 changes as a circumference optical path length of the ring modulator 102 changes due to an error in manufacturing the ring modulator 2 and/or a temperature change, resulting in a discrepancy between the resonance wavelength and the wavelength of the laser light being emitted. As depicted in FIG. 10, to compensate for the discrepancy, the heater 105 heats the ring modulator 102 to raise the temperature of it for adjustment of the resonance wavelength.

In this case, however, it is undesirably difficult not only to ensure reliability of the optical element but also to improve power efficiency in the wavelength adjustment mechanism and modulation operation for the transmissivity (decrease in electric power necessary for the heater and modulation operation). The reason for this is as follows.

Figure 11A:
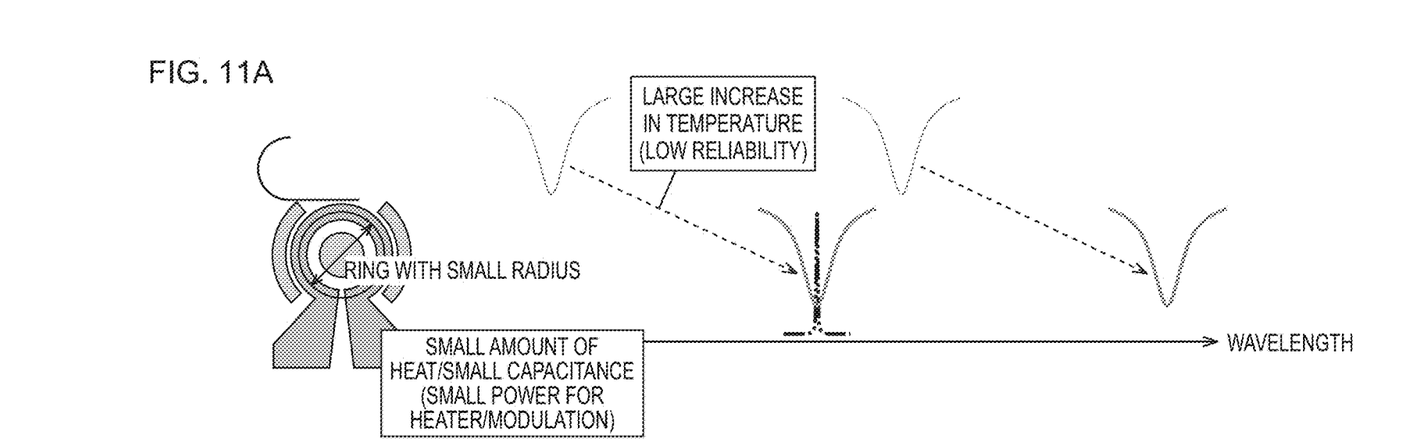
FIGS. 11A and 11B are diagrammatic views describing problems in the optical element of related art.

As depicted in FIG. 11A, reducing the radius of the ring modulator 102 reduces the volume of the ring modulator 102, whereby heater power required to compensate for the wavelength shift resulting from variation in temperature is decreased. Furthermore, reducing the radius of the ring modulator 102 reduces a capacitance that serves as a load when viewed from a drive circuit of the ring modulator 102, whereby the modulation power is deceased. On the other hand, because the difference between the laser and the ring modulator wavelength amounts up to the free spectral range (FSR), an increased FSR increases the amount of required wavelength compensation, resulting in an increase in the amount of increase in the temperature of the ring modulator 102 and hence a decrease in reliability of the ring modulator 102.

Figure 11B:
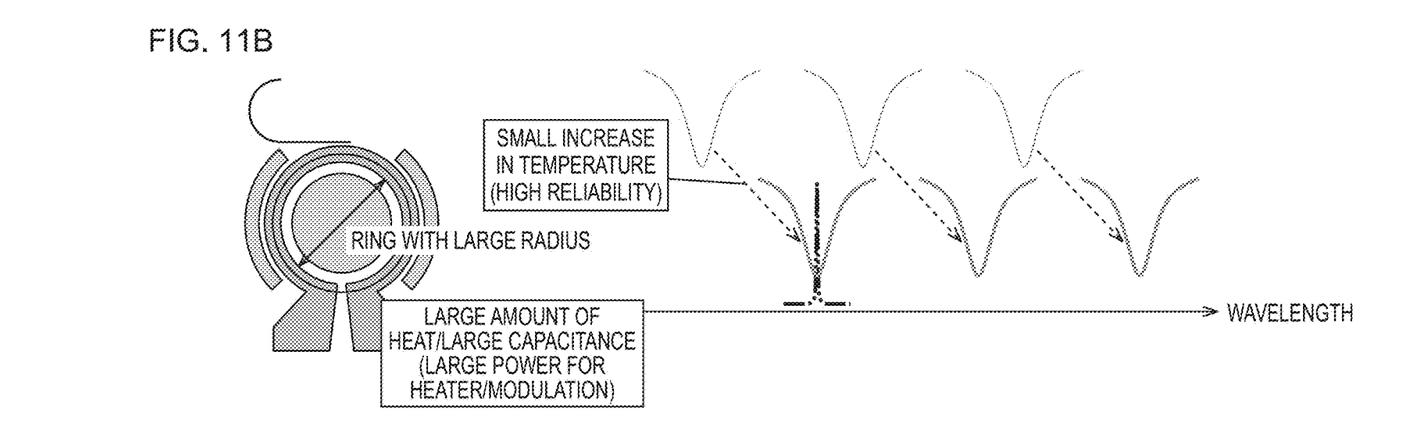

As depicted in FIG. 11B, increasing the radius of the ring modulator 102 reduces the FSR, resulting in a decrease in the amount of wavelength compensation, which reduces the amount of increase in the temperature of the ring modulator 102, whereby reliability of the ring modulator 102 is ensured. On the other hand, the volume of the ring modulator 102 increases, resulting in increases in modulation power, and heater power required to compensate for the wavelength shift due to variation in temperature.

The technique disclosed in Patent Document 1 has been devised in order to address the described problems. Patent Document 1 discloses the technique in which the resonance wavelength of a ring modulator causes laser oscillation. A discrepancy between the resonance wavelength of the ring modulator and the laser wavelength is thus at most an interval between Fabry-Perot (FP) modes. This enables a significant decrease in the amount of wavelength compensation as compared with the related art that was required to compensate for the wavelength shift by the free spectral range (FSR) at the maximum, whereby a significant effect for the decrease in temperature increase, namely for the improvement in reliability is exhibited.

In the case of Patent Document 1, however, an intensity-modulated optical signal is dispersed to two ports, thus to cause a problem that the power of output light per one port decreases by half.

Patent Document 1: Japanese Laid-open Patent Publication No. 2015-230991
Patent Document 2: Japanese Laid-open Patent Publication No. 2012-64862
Patent Document 3: Japanese Laid-open Patent Publication No. 2009-59729

SUMMARY

An aspect of an optical element includes a band-pass filter whose center wavelength can be modulated, a first optical waveguide and a second optical waveguide configured to be optically coupled to the band-pass filter, and a gain waveguide configured to have one waveguide end connected to the first optical waveguide or the second optical waveguide and have the other waveguide end on which a reflective film is provided, wherein the first optical waveguide and the second optical waveguide are formed so as to be optically coupled at a first point of one waveguide ends thereof and optically coupled at a second point of the other waveguide ends thereof, and the difference in optical path length from the first point to the second point between the first optical waveguide and the second optical waveguide is an integral multiple of the optical wavelength.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferable embodiments of an optical element will be described below in detail with reference to the drawings.

First Embodiment

Figure 1:
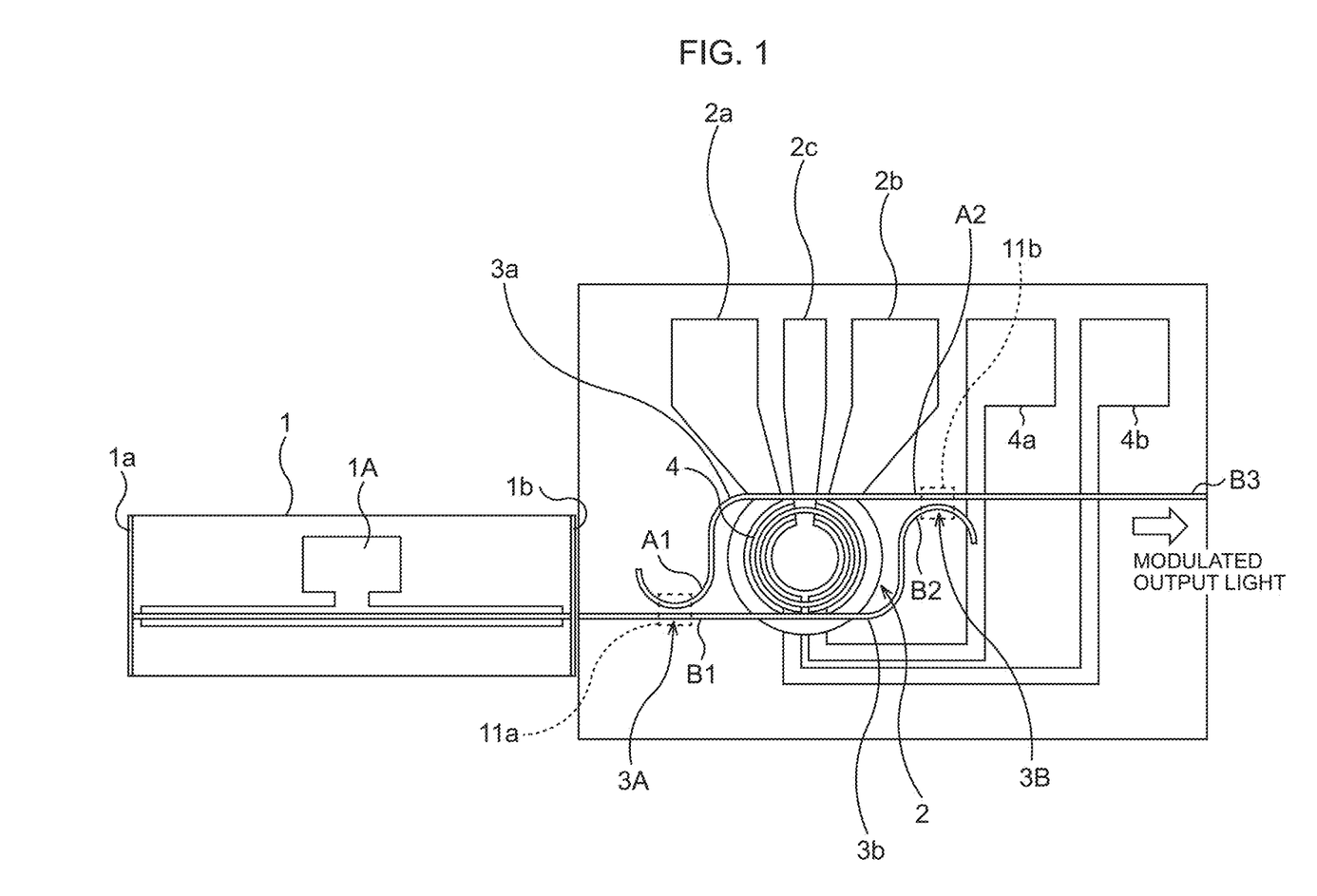
FIG. 1 is a diagrammatic view depicting a schematic configuration of an optical element according to a first embodiment.

FIG. 1 is a diagrammatic view depicting a schematic configuration of an optical element according to a first embodiment.

The optical element includes a gain chip 1, which is an optical amplifier (gain waveguide), a ring modulator 2, which is a band-pass filter, a first optical waveguide 3a and a second optical waveguide 3b that are optically connected to the ring modulator 2, and a heater 4.

The gain chip 1, which is an optical amplifier made of, for example, a III-V semiconductor, includes an electrode 1A and has one waveguide end on which a highly reflective (HR) film 1a is formed and has the other waveguide end on which an anti-reflective (AR) film 1b is formed.

As the gain waveguide, in place of the gain chip 1, a chip monolithically integrated on an optical integrated circuit of, for example, Si may be used. Concrete examples of the above include a gain medium using GeSn. Furthermore, it is also possible to use a gain waveguide obtained by a gain medium made of a compound semiconductor being wafer bonded to a waveguide of Si to be evanescently coupled.

Figure 2:
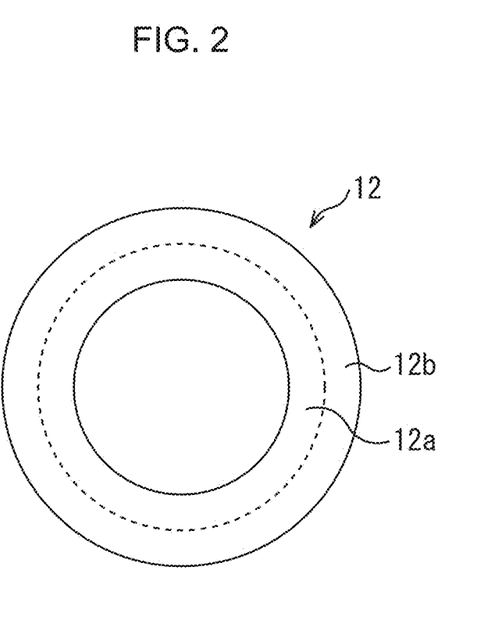
FIG. 2 is a diagrammatic view depicting one example of a ring modulator.

The ring modulator 2 is a band-pass filter and is formed, for example, of a silicon wire. As depicted in FIG. 2, in the ring modulator 2, a P-type doped region 12a and an N-type doped region 12b are provided to form a PN junction (or PIN junction) in a ring-shaped optical waveguide 12 formed of a silicon wire having a radius of, for example, about 5 µm. In the ring modulator 2, electrodes 2a and 2b and an electrode 2c in a center part of the ring modulator 2 are disposed to modulate the resonance wavelength based on a modulation signal and in accordance with the intensity thereof. The electrodes 2a, 2b have the same polarity, and are conductive to each other. The electrode 2c in the center part of the ring modulator 2 has different polarity from the electrodes 2a, 2b. These electrodes form a group of electrodes. The ring modulator 2 changes the refractive index of the optical waveguide to modulate the resonance wavelength by a reverse bias voltage or a forward bias voltage applied by the group of electrodes 2a, 2b, and 2c between the P-type doped region 12a and the N-type doped region 12b. Although the above is the case where the ring modulator utilizes the refractive index change caused in the PN junction or PIN junction, how to change the refractive index is not limited to the above-described case, and may be any structure including an electro-optic effect. A structure using, for example, a polymer having electro-optic effect may be used, or a structure having a metal oxide semiconductor (MOS) to change the refractive index may also be used.

The first optical waveguide 3a and the second optical waveguide 3b are formed of, for example, a silicon wire. The second optical waveguide 3b has a waveguide edge butt-joined to the other waveguide end of the gain chip 1. The first optical waveguide 3a has one waveguide end at which a port A1 is provided and has the other waveguide end at which a port A2 is provided. The second optical waveguide 3b has one waveguide end at which a port B1 is provided and has the other waveguide end at which a port B2 is provided. In the first optical waveguide 3a and the second optical waveguide 3b, a first light coupling point 3A is formed at the ports A1, B2, and a second light coupling point 3B is formed at the ports A2, B2. At the first light coupling point 3A, light coupling and branching are performed, and at the second light coupling point 3B, light coupling is performed. The difference in optical path length (product of the refractive index and the length) from the first light coupling point 3A to the second light coupling point 3B between the first optical waveguide 3a and the second optical waveguide 3b is an integral multiple (zero multiple, one multiple, two multiples, . . . ) of an optical wavelength. A farther waveguide end of the first optical waveguide 3a from the aforementioned other waveguide end at which the port A2 is provided serves as an output light output port B3. In the present embodiment, the first optical waveguide 3a and the second optical waveguide 3b are formed to be equal in the optical path length (have no difference in the optical path length) between the first light coupling point 3A and the second light coupling point 3B, and equal in shape and length between the first light coupling point 3A and the second light coupling point 3B. In other words, the first optical waveguide 3a and the second optical waveguide 3b are formed to be symmetrical with the ring modulator 2 interposed therebetween (with respect to the ring modulator 2).

At the first and second light coupling points 3A, 3B, optical couplers 11a, 11b, each of which is, for example, a directional coupler, are provided respectively, where coupling and branching of the first optical waveguide 3a and the second optical waveguide 3b are performed. Each coupling and branching device using, for example, a Y-branch joint and a MMI (Multi-Mode Interface) may be provided at the first and second light coupling points 3A, 3B in place of the optical couplers 11a, 11b.

The heater 4 includes a pair of electrodes 4a and 4b to which a control signal that adjusts a bias of the center wavelength is inputted, and heats the ring modulator 2 in accordance with the control signal to adjust the ring resonance wavelength.

In the present embodiment, heater 4 is exemplified as part of the wavelength adjustment mechanism of the ring modulator 2, but the wavelength adjustment mechanism does not necessarily include a heater, and methods of applying current to the forward direction through a PN or PIN junction may be employed. In this case, the ring modulator has two portions. One of the portions having a pair of first electrodes is used as an intensity modulation region that modulates the resonance wavelength based on a modulation signal and in accordance with the intensity thereof. The other portion having a pair of second electrodes is used as a wavelength adjustment region to which a wavelength modulation control signal is inputted.

In the optical element in the present embodiment, optically connecting the first optical waveguide 3a and the second optical waveguide 3b at the first light coupling point forms a loop mirror structure that allows reverse return of light to the first optical waveguide 3a before branching of light into two directions. A transmission wavelength region between the first light coupling point 3A and the second light coupling point 3B of the first optical waveguide 3a and the second optical waveguide 3b with the ring modulator 2 interposed therebetween has a size that allows selecting one of a plurality of longitudinal modes in which laser oscillation is possible to occur. An optical resonator formed by the highly reflective (HR) film 1a of the gain chip 1 and the loop mirror structure causes laser oscillation in a plurality of Fabry-Perot (FP) modes having a wavelength interval determined by the optical path length between the first and second light coupling points 3A, 3B. Among the plurality of existing FP modes, only the FP mode whose transmissivity is the highest in the pass band of the ring modulator 2 causes lasing. In accordance with the modulation signal inputted to the ring modulator 2, the emitted light is intensity-modulated and is outputted through the output port B3 of the first optical waveguide 3a.

Applying a digital modulation signal that changes between voltages $V_0$ and $V_1$ to the electrodes 2a and 2b of the ring modulator 2 allows the resonance wavelength to be modulated in accordance with the intensity of the modulation signal. Transmissivity, $T_{out}$ to the output port at the emitted light wavelength can thus be modulated. The power $P_{out}$ of the output light is equal to the product of the optical power $P_r$ in the optical resonator and the transmissivity $T_{out}$, and thus a design of the optical resonator with reduced variation in $P_r$ allows the power $P_{out}$ to be modulated in correspondence with the modulation signal.

Figure 3:
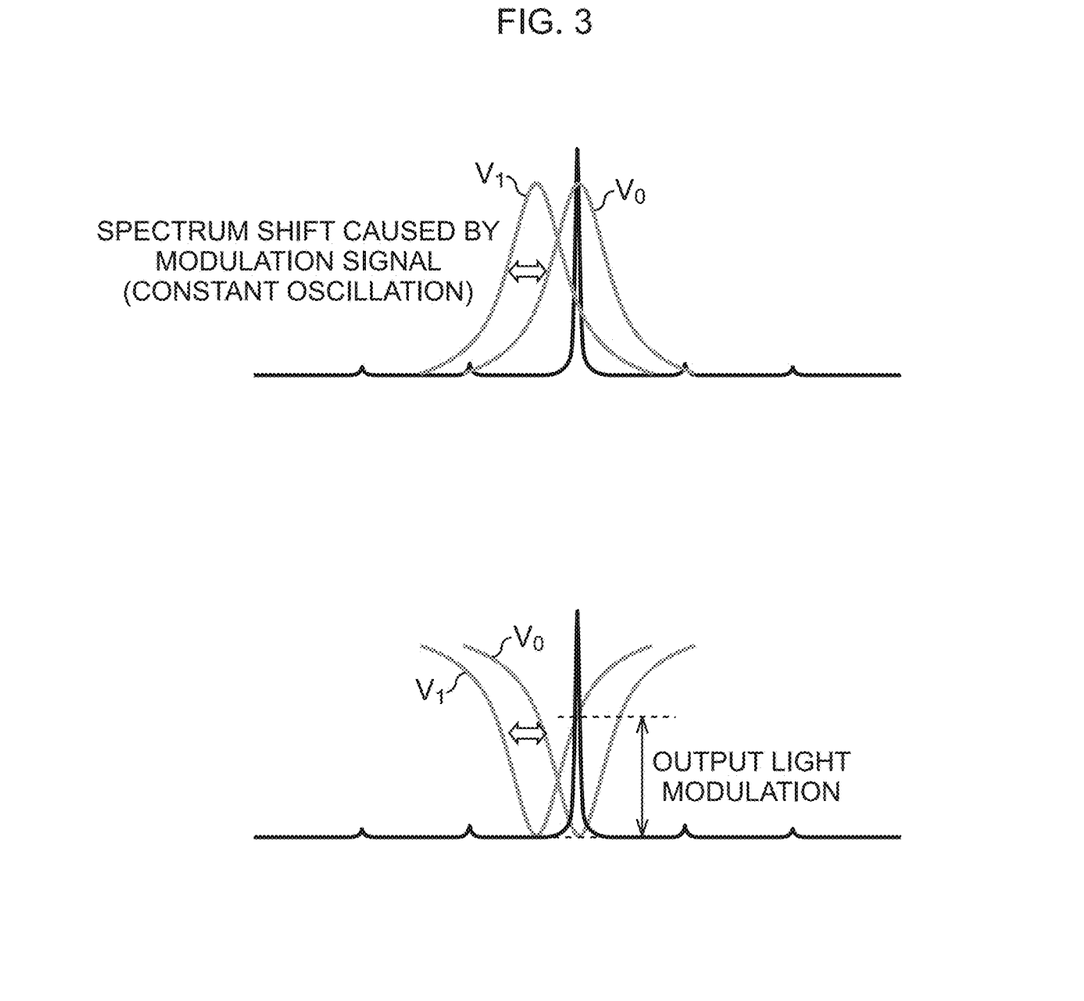
FIG. 3 is a diagram depicting the relationship between a resonance wavelength spectrum and an emitted light spectrum in the case where the resonance wavelength coincides with the emitted light wavelength when a voltage $V_0$ is applied.

In the optical element, the case when the modulation signal to be applied to the electrodes 2a to 2c of the ring modulator 2 is $V_0$ or $V_1$ allows the resonance wavelength (center wavelength of a resonance wavelength spectrum) to coincide with the emitted light wavelength, whereby output light with a high extinction ratio can be produced. FIG. 3 depicts the relationship between a resonance wavelength spectrum and an emitted light spectrum in the case where the resonance wavelength coincides with the emitted light wavelength when the voltage $V_0$ is applied. Regarding the resonance wavelength of the ring modulator 2 and the emitted light wavelength in the FP mode, the emitted light wavelength in the FP mode does not necessarily coincide with the resonance wavelength in an initial state when the voltage $V_0$ or $V_1$ is applied due to existence of fabrication variation and/or temperature variation. There will be described below the amount of wavelength shift required for making the resonance wavelength of the ring modulator 2 and the emitted light wavelength in the FP mode coincide with each other.

Figure 4A:
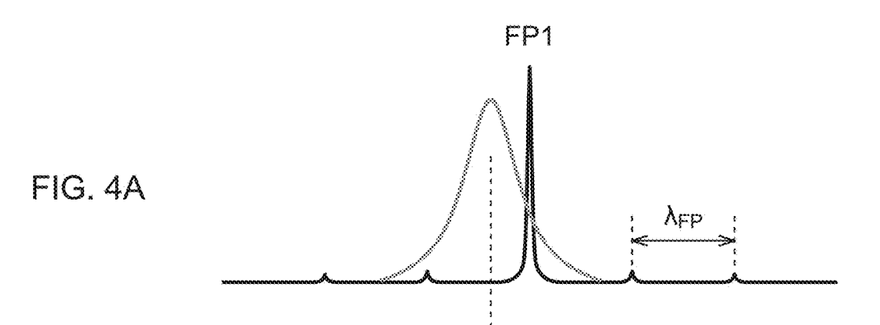
FIG. 4A and FIG. 4B are diagrams depicting how an initial wavelength discrepancy is compensated.
Figure 5A:
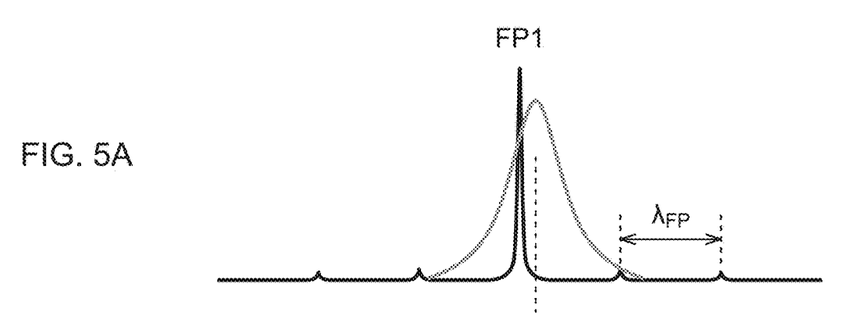
FIG. 5A and FIG. 5B are diagrams depicting how a wavelength discrepancy is compensated.

The FP mode that causes light emission exists in the pass band of the ring modulator 2. At this time, two cases can be considered, one of which is the case where the resonance wavelength is on the short wavelength side relative to the FP mode that causes light emission (to be referred to as FP1, hereinafter) (FIG. 4A), and the other of which is the case where the resonance wavelength is on the long wavelength side relative to FP1 (FIG. 5A).

Figure 4B:
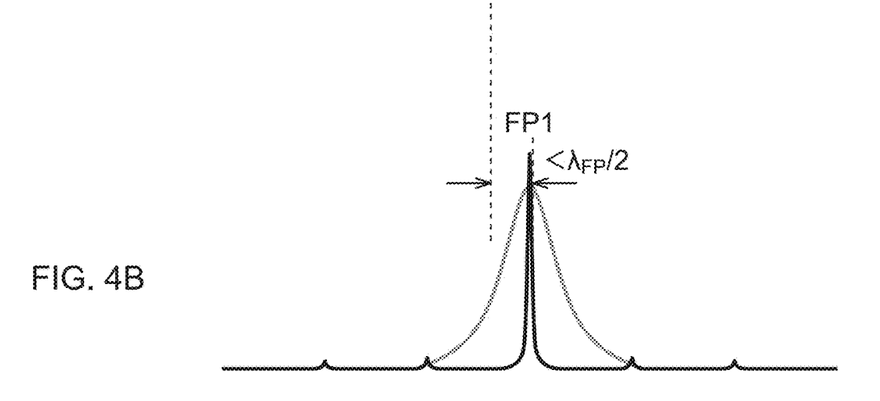

In the case when the resonance wavelength is on the short wavelength side relative to FP1, applying current to the electrodes 4a, 4b of the heater 4 causes the resonance wavelength to shift to the long wavelength side, thereby allowing the resonance wavelength to coincide with FP1. The shift amount of the resonance wavelength at this time becomes equal to or less than $P_{FP}/2$ (FIG. 4B) assuming that power of the heater 4 required for the wavelength shift by an FP mode interval ($\lambda_{FP}$) is defined as $P_{FP}$. This is because FP1 among the plurality of FP modes is the closest to the initial resonance wavelength and thus the shift amount of the resonance wavelength is equal to or less than half the FP mode interval $\lambda_{FP}$.

Figure 5B:
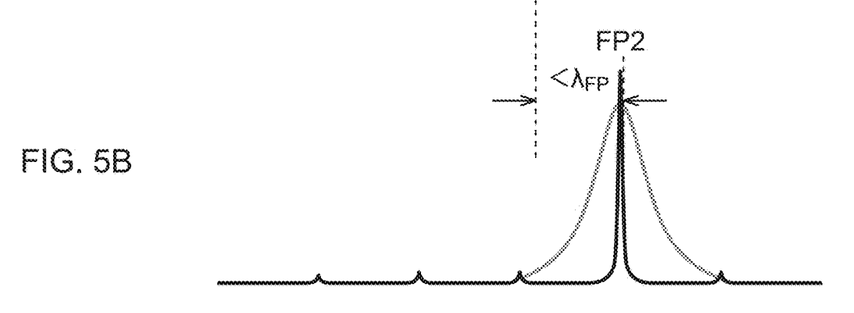

In the case when the resonance wavelength is on the long wavelength side relative to FP1, as the resonance wavelength shifts to the long wavelength side, which is caused by application of current to the electrodes 4a, 4b of the heater 4, the light emission in the FP mode that is occurring is stopped and light emission in an FP mode existing adjacent to the FP mode on the long wavelength side (to be referred to as FP2, hereinafter) is started (FIG. 5B). The resonance wavelength at this time is on the short wavelength side relative to FP2, and therefore a further increase in current allows the resonance wavelength to coincide with FP2. The shift amount of the resonance wavelength at this time is equal to or less than the FP mode interval $\lambda_{FP}$, to therefore ensure that the electric power consumed by the heater 4 becomes equal to or less than $P_{FP}$.

As described above, even though the resonance wavelength is either on the short wavelength side or on the long wavelength side relative to FP1, the electric power consumed by the heater, which is equal to or less than $P_{FP}$, allows compensation for an initial wavelength discrepancy.

Figure 6A:
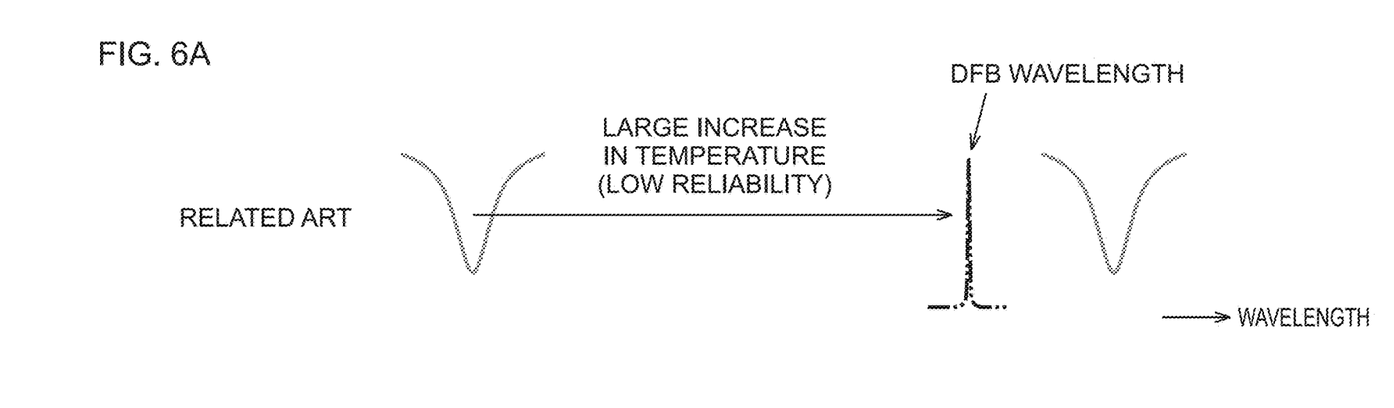
FIG. 6A and FIG. 6B are diagrams depicting required increases in temperatures for the related art and the first embodiment.

In the ring modulator 2 using optical waveguides each formed of a silicon wire, the ring radius can be reduced to about 5 μm without a significant increase in the bending loss, and the electric power necessary for the modulation and the electric power consumed by the heater 4 can be lowered as the ring radius decreases. In the case that the ring radius is 5 μm, the free spectral range (FSR) becomes about 19 nm. In this case, a wavelength shift of about 19 nm is required at the maximum in the related art as depicted in FIG. 6A.

Figure 6B:
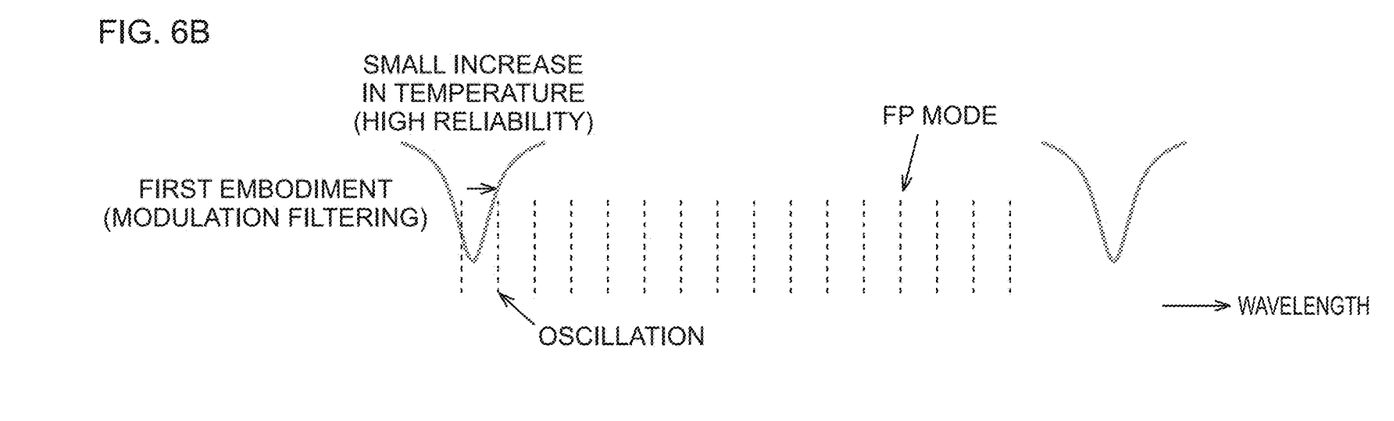

In contrast, in the present embodiment, in which the optical resonator length is set at about 350 μm, the FSR becomes about 1.0 nm. In this case, as depicted in FIG. 6B, the amount of wavelength shift compensation becomes 1.0 nm at the maximum. When the amount of wavelength shift compensation is converted into temperature by using a wavelength-temperature coefficient of 0.07 nm/K for an optical waveguide formed of a silicon wire, it is necessary to increase the temperature by approximately 271° C. in the related art. In contrast, in the present embodiment, an increase in temperature is only 14° C., resulting in a significant improvement in reliability as compared with the related art. The electric power consumed by the heater can also be reduced to about 1.0 nm/19 nm×100≈5.3%.

Figure 7:
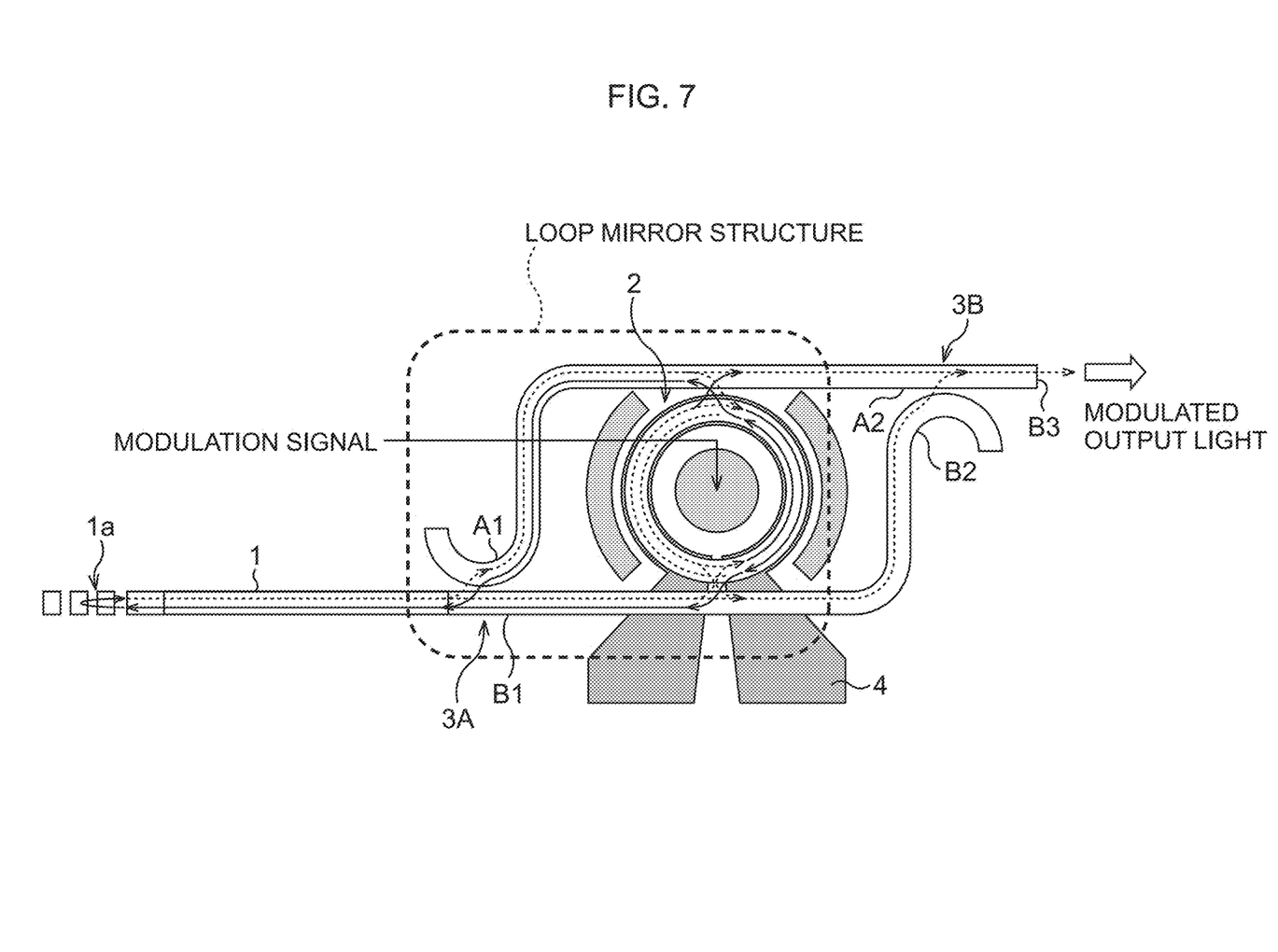
FIG. 7 is a diagrammatic view depicting the optical element in a simplified manner for describing the feature of the optical element according to the first embodiment.

FIG. 7 is a diagrammatic view depicting the optical element in a simplified manner for describing the feature of the optical element according to the first embodiment.

In the optical element according to the present embodiment, optically connecting the first optical waveguide 3a and the second optical waveguide 3b after branching of light into two directions at the first light coupling point 3A forms a loop mirror structure that allows reverse return of light to the first optical waveguide 3a before branching of light into two directions. The first optical waveguide 3a and the second optical waveguide 3b have the ports A2, B2 other than the ports A1, B1 in the loop mirror structure, and through each of the ports A2, B2, a modulated optical signal whose optical power is decreased in half is outputted. The ports A2, B2 are connected to each other at the second light coupling point 3B, and by making the phases of the ports A2, B2 coherent, the ports A2, B2 are coupled to one port, through which the modulated optical signal can be outputted.

In the present embodiment, the difference in optical path length from the first light coupling point 3A to the second light coupling point 3B between the first and second optical waveguides is an integral multiple of an optical wavelength, and the optical path lengths of the both are equal here. Concretely, the first optical waveguide 3a and the second optical waveguide 3b are formed to be equal in shape and length between the first light coupling point 3A and the second light coupling point 3B. In other words, they are formed to be symmetrical. At the first light coupling point 3A and the second light coupling point 3B, the mutually same coupling and branching devices (optical couplers 11a, 11b, and the like) are provided. Application of this configuration does not require an optical wavelength level adjustment of the optical path lengths of the first optical waveguide 3a and the second optical waveguide 3b, and the phases of the ports A2, B2 are made coherent, resulting in aggregation of the optical power at one port. The first optical waveguide 3a and the second optical waveguide 3b are formed symmetrically so as to have a branching and coupling structure, similarly to a Mach-Zehnder interferometer, for example. The first optical waveguide 3a and the second optical waveguide 3b are each formed to have an arm length several times as long as the diameter, (which is about 10 μm), of the ring modulator 2, thereby stabilizing the phase relationship between the both, resulting in that the output light can be guided to one port.

EXAMPLE

A specific example of the optical element according to the present embodiment will be described below.

In the present example, the optical element is configured as follows: the gain chip comprises a III-V semiconductor, for example, InGaAsP/InP; a highly reflective (HR) coating having a reflectivity of 98% formed on one waveguide edge of the gain chip to form a highly reflective (HR) film; and an anti-reflective (AR) coating formed on the other waveguide edge of the gain chip to form an anti-reflective (AR) film. The gain chip is flip-chip mounted on a terrace of an SOI substrate, and is butt-jointed to a silicon sub-micron optical waveguide formed by processing an SOI layer of the SOI substrate.

Using, for the ring modulator, a silicon sub-micron optical waveguide with a radius of about 5 μm, which has a PN junction or PIN junction, and using a 3 dB optical coupler for each two of four ports in the first and second optical waveguides of the ring modulator allow the first and second optical waveguides to be coupled, thereby guiding lights to one optical waveguide. By setting the gain chip length to about 300 μm and setting the resonator length to about 350 μm for one way, the interval between the FP modes becomes 130 GHz. In this case, when the full width at the half maximum (FWHM) of the ring modulator is set at 50 GHz, only one of the laser modes can be selectively oscillated, and moreover, the ring modulator can provide a modulation band up to about 50 GHz.

According to the aspects described above, an excellent, minute optical element is able to increase the power of output light largely (double the power of output light as compared with the optical element in Patent Document 1) while meeting the two requirements at the same time, one of which is to ensure the reliability of the optical element and the other of which is to improve power efficiency in modulation operation.

Second Embodiment

In the second embodiment, an optical element is disclosed as in the first embodiment, but the disclosed optical element differs from the optical element according to the first embodiment in that it is a multi-wavelength optical element.

Figure 8:
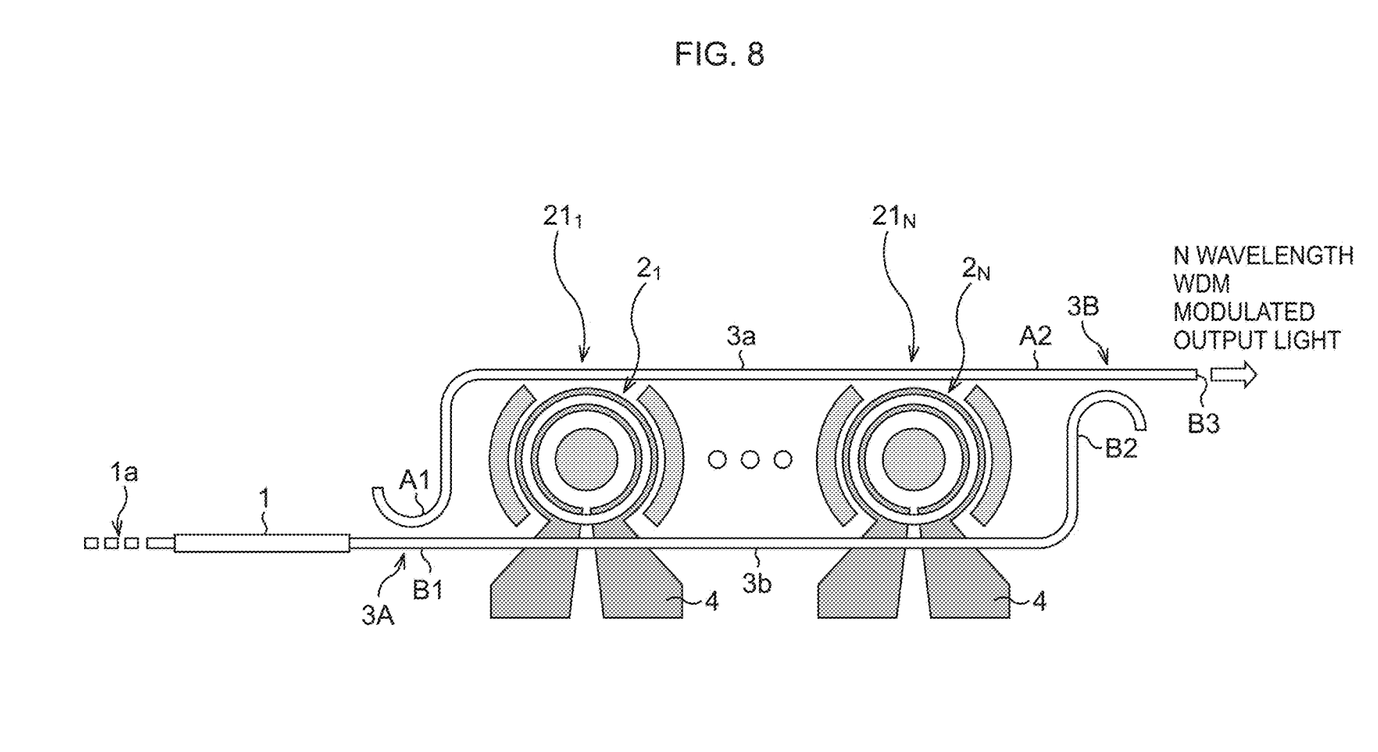
FIG. 8 is a diagrammatic view depicting a schematic configuration of an optical element according to a second embodiment.

FIG. 8 is a diagrammatic view depicting a schematic configuration of the optical element according to the second embodiment. The constituent members and other components corresponding to those in the first embodiment have the same reference characters as those in FIG. 7 and will not be described in detail.

The optical element includes a gain chip 1, which is a gain waveguide, a plurality of light modulation units $21_1$ to $21_N$ (N≥2), and a first optical waveguide 3a and a second optical waveguide 3b that are optically connected to the light modulation units $21_1$ to $21_N$ (N≥2).

The light modulation unit $21_k$ (1≤k≤N) includes a ring modulator $2_k$, which is a band-pass filter, and a heater 4.

The first optical waveguide 3a and the second optical waveguide 3b are optically connected to ring modulators $2_1$ to $2_N$ provided in parallel commonly. The first optical waveguide 3a and the second optical waveguide 3b are formed to be equal in shape and length between a first light coupling point 3A and a second light coupling point 3B. In other words, the first optical waveguide 3a and the second optical waveguide 3b are formed to be symmetrical.

In the optical element according to the present embodiment, optically connecting the first optical waveguide 3a and the second optical waveguide 3b at the first light coupling point forms a loop mirror structure that allows reverse return of light to the first optical waveguide 3a before branching of light into two directions. An optical resonator formed by a highly reflective (HR) film 1a of the gain chip 1 and the loop mirror structure causes laser oscillation in a plurality of FP modes having a wavelength interval determined by the optical path length between the first and second light coupling points 3A, 3B. The N ring modulators $2_1$ to $2_N$, each of which is a band-pass filter, are disposed in the optical resonator. The ring modulators $1_1$ to $2_N$ have resonance wavelengths $\lambda_1, \lambda_2, \ldots, \lambda_N$ different from one another and have transmission peaks in the vicinities of the resonance wavelengths $\lambda_1, \lambda_2, \ldots, \lambda_N$. Only lights in the vicinities of the resonance wavelengths $\lambda_1, \lambda_2, \ldots, \lambda_N$ are therefore allowed to be fed back to the gain chip 1. As a result, FP modes in the vicinities of the resonance wavelengths $\lambda_1, \lambda_2, \ldots, \lambda_N$ can be oscillated and intensity-modulated at the same time. The configuration described above achieves a multi-wavelength optical element capable of coupling lights.

In the present embodiment, the difference in optical path length from the first light coupling point 3A to the second light coupling point 3B between the first and second optical waveguides is an integral multiple of an optical wavelength, and the optical path lengths of the both are equal here. Concretely, the first optical waveguide 3a and the second optical waveguide 3b are formed to be equal in shape and length between the first light coupling point 3A and the second light coupling point 3B. In other words, they are formed to be symmetrical. At the first light coupling point 3A and the second light coupling point 3B, the mutually same coupling and branching devices (optical couplers 11a, 11b, and the like) are provided. Application of this configuration does not require an optical wavelength level adjustment of the optical path lengths of the first optical waveguide 3a and the second optical waveguide 3b, and the phases of ports A2, B2 are made coherent, resulting in aggregation of the optical power at one port.

As the gain waveguide, a quantum dot may be used in place of the gain chip 1. Use of the quantum dot enables further stabilization of oscillations caused with a plurality of wavelengths. A quantum well may be used in place of the quantum dot.

According to the aspects described above, an excellent, minute multi-wavelength optical element is able to increase the power of output light largely (double the power of output light as compared with the optical element in Patent Document 1) while meeting the two requirements at the same time, one of which is to ensure the reliability of the optical element and the other of which is to improve power efficiency in modulation operation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An optical element, comprising:
a band-pass filter whose center wavelength can be modulated;
a first optical waveguide configured to be optically coupled to the band-pass filter;
a second optical waveguide configured to be optically coupled to the band-pass filter and have an output port; and
a gain waveguide configured to have one waveguide end connected to the first optical waveguide or the second optical waveguide and have the other waveguide end on which a reflective film is provided;
a first optical directional coupler for optically coupling the first optical waveguide and the second optical waveguide without intermediation of the band-pass filter at a first point on one side of the band-pass filter; and
a second optical directional coupler for optically coupling the first optical waveguide and the second optical waveguide without intermediation of the band-pass filter at a second point on the other side of the band-pass filter,
wherein
the band-pass filter, the first optical waveguide and the second optical waveguide have a loop mirror structure where light is returned from the second optical waveguide to the first optical waveguide at the first point, and
the difference in optical path length from the first point to the second point between the first optical waveguide and the second optical waveguide is an integral multiple of the optical wavelength.

2. The optical element according to claim 1, wherein the first optical waveguide and the second optical waveguide are equal in optical path length between the first point and the second point.

3. The optical element according to claim 1, wherein the first optical waveguide and the second optical waveguide are equal in shape between the first point and the second point.

4. The optical element according to claim 1, wherein the first optical waveguide and the second optical waveguide are formed to be symmetrical between the first point and the second point.

5. The optical element according to claim 1, wherein a transmission wavelength region between the first point and the second point of the first optical waveguide and the second optical waveguide with the band-pass filter interposed therebetween has a size that allows selecting one of a plurality of longitudinal modes in which laser oscillation is possible to occur, and the laser oscillation occurs in a single longitudinal mode.

6. The optical element according to claim 1, comprising a plurality of band-pass filters each identical to the band-pass filter, wherein
the first optical waveguide and the second optical waveguide are optically connected to the plurality of band-pass filters.

7. The optical element according to claim 1, wherein the band-pass filter is a ring modulator that modulates the center wavelength in accordance with the intensity of a modulation signal.

8. The optical element according to claim 7, wherein the ring modulator is formed of an optical waveguide formed of a silicon wire, and in the optical waveguide, a P-type region and an N-type region are provided.

9. The optical element according to claim 7, further comprising: a pair of first electrodes and a pair of second electrodes, wherein
the first electrodes are provided in the ring modulator, and each are an electrode to which a modulation signal that modulates the center wavelength is inputted, and
the second electrodes each are an electrode to which a control signal that adjusts a bias of the center wavelength is inputted.

10. The optical element according to claim 7, further comprising a heater that adjusts the temperature of the ring modulator to adjust a bias of the center wavelength.

11. The optical element according to claim 1, wherein the first optical waveguide has a first linear portion and a first curve-shaped portion,
the second optical waveguide has a second linear portion and a second curve-shaped portion, and
the first optical waveguide and the second optical waveguide are optically coupled at the first point where the first linear portion and the second curve-shaped portion are close to each other and the second point where the second linear portion and the first curve-shaped portion are close to each other.

* * * * *